No. 633,385. Patented Sept. 19, 1899.
L. T. MANN.
MEANS FOR TRANSMITTING POWER FROM AXLES TO BODIES OF RAILROAD CARS.
(Application filed Dec. 10, 1898.)
(No Model.) 5 Sheets—Sheet 2.
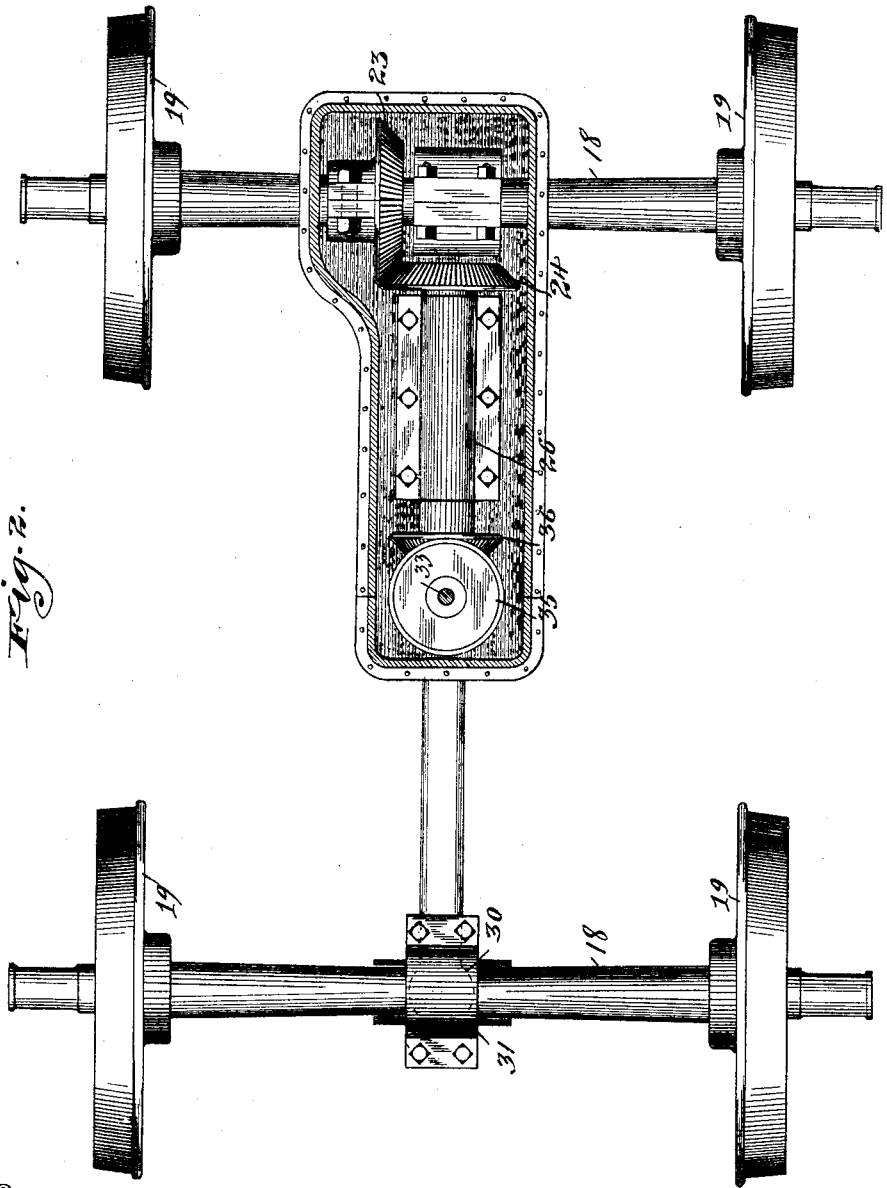

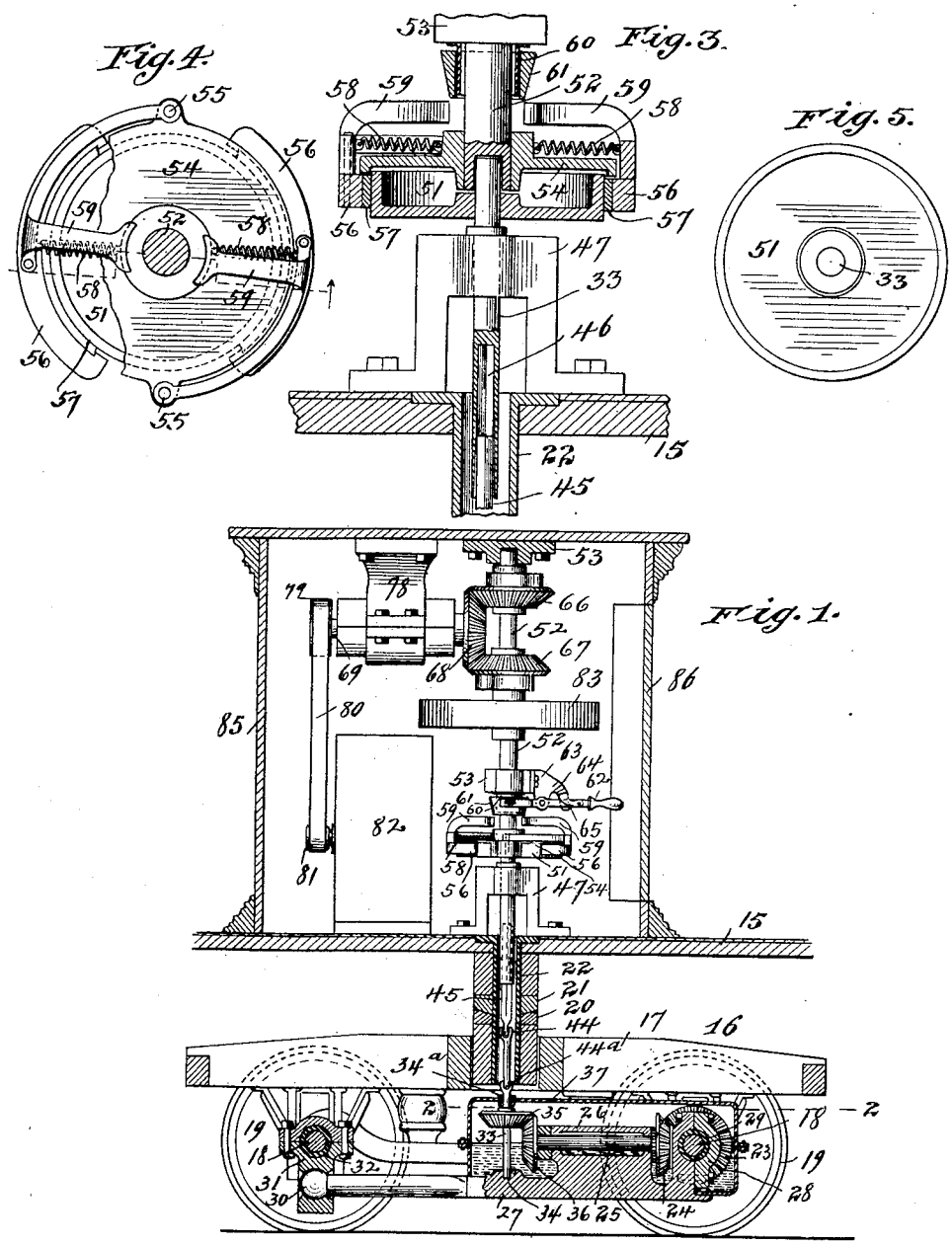

No. 633,385. Patented Sept. 19, 1899.
L. T. MANN.
MEANS FOR TRANSMITTING POWER FROM AXLES TO BODIES OF RAILROAD CARS.
(Application filed Dec. 10, 1898.)
(No Model.) 5 Sheets—Sheet 3.

No. 633,385. Patented Sept. 19, 1899.
L. T. MANN.
MEANS FOR TRANSMITTING POWER FROM AXLES TO BODIES OF RAILROAD CARS.
(Application filed Dec. 10, 1898.)
(No Model.) 5 Sheets—Sheet 4.

Witnesses, Inventor,

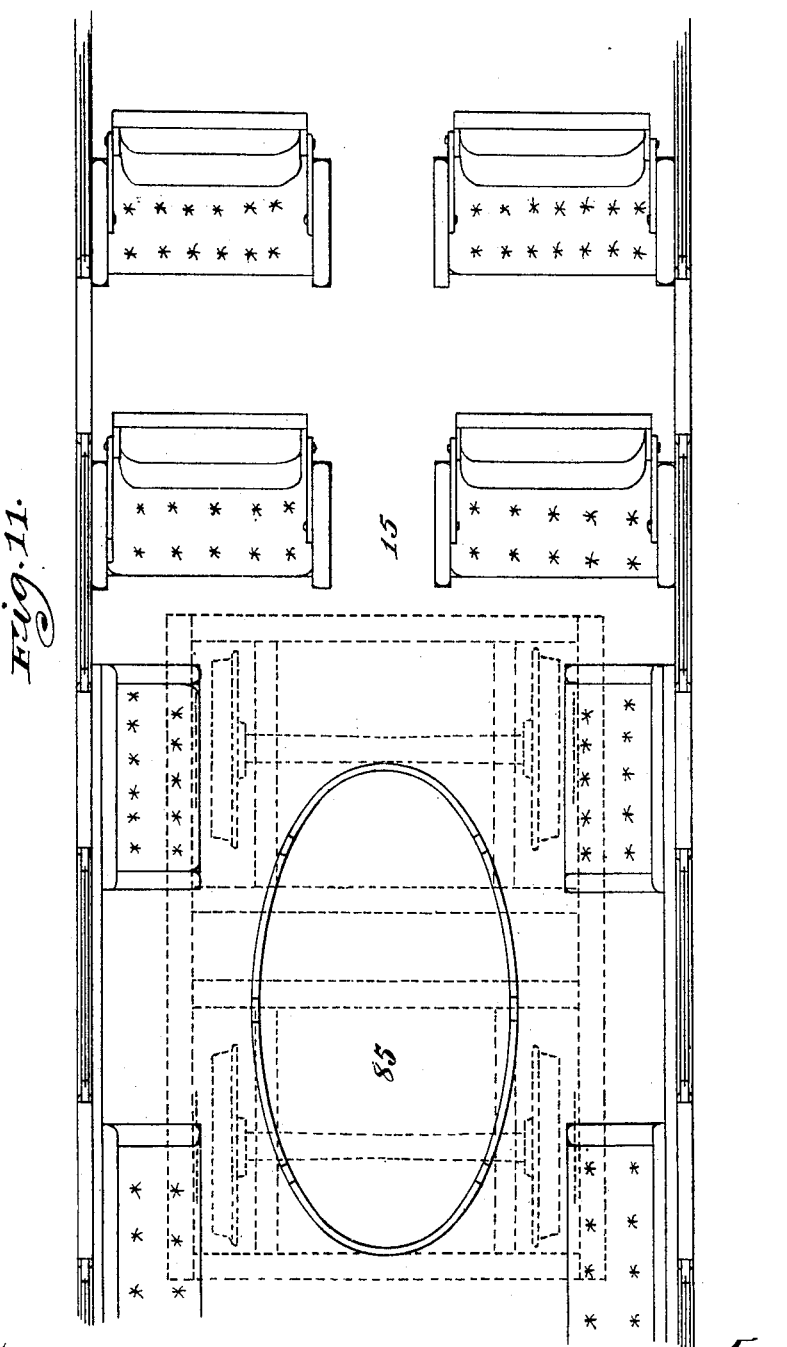

UNITED STATES PATENT OFFICE.

LOUIS T. MANN, OF CHICAGO, ILLINOIS.

MEANS FOR TRANSMITTING POWER FROM AXLES TO BODIES OF RAILROAD-CARS.

SPECIFICATION forming part of Letters Patent No. 633,385, dated September 19, 1899.

Application filed December 10, 1898. Serial No. 698,892. (No model.)

*To all whom it may concern:*

Be it known that I, LOUIS T. MANN, of Chicago, in the county of Cook and State of Illinois, have invented certain new and useful Improvements in Means for Transmitting Power from the Axles to the Bodies of Railway-Cars, of which the following is a specification.

This invention relates to means for transmitting power from the axles to the bodies of railway-cars, being especially adapted for electrically lighting and heating such cars, and has for its chief object to provide a practical construction whereby power may be transmitted from one of the axles of the car to a dynamo-electric generator carried by the car-body proper, the mechanism being of such a character that the transmission of the motion will be unaffected by the variations in relative distance and position between the car body and axle which occur in practice when the car is in motion.

The invention has for a further object the provision of mechanism for automatically preventing excessive speed of the generator upon any increase in speed of the driving-axle beyond a predetermined rate and for readily connecting and disconnecting the generator relatively to its motive power.

To these and other ends the invention consists in certain novel features, which I will now proceed to describe and will then particularly point out in the claims.

Figure 6:
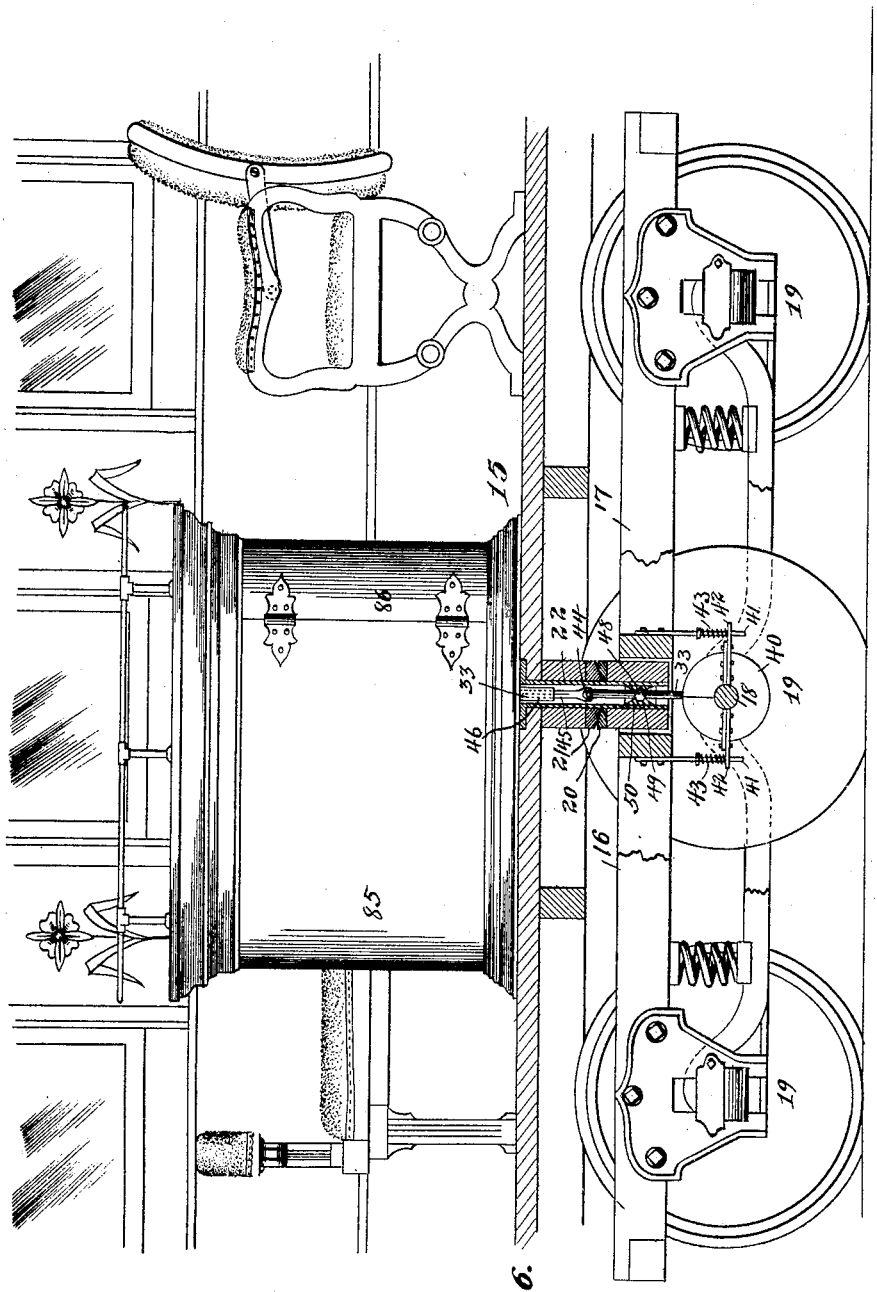
Figure 7:
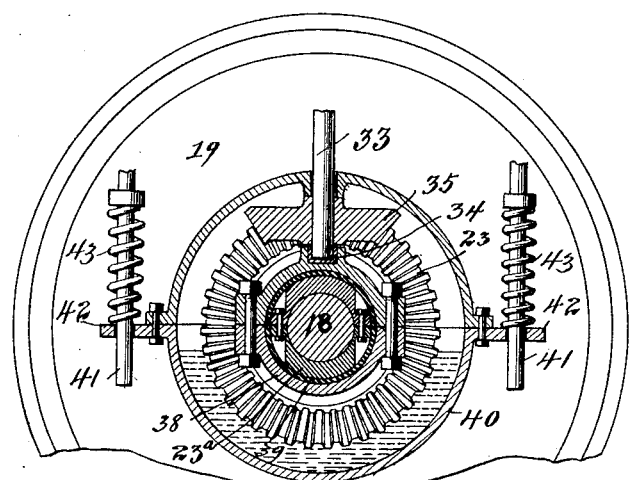
Figures 9, 10:
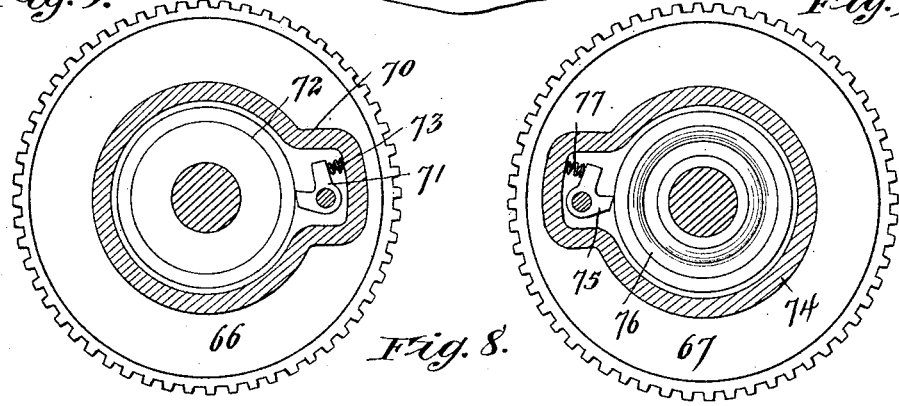
Figure 8:
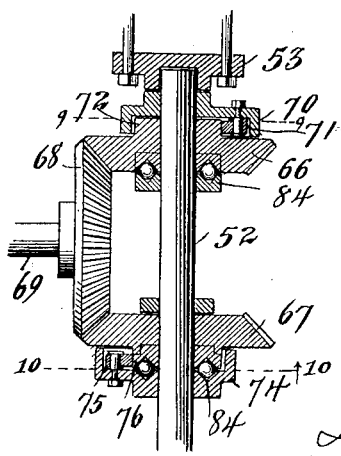

In the accompanying drawings, Figure 1 is a vertical sectional view, partly in elevation, of a car-truck and a portion of a car-body having my improvements applied thereto. Fig. 2 is a plan section taken on the line 2 2 of Fig. 1, the gear-casing being also shown in horizontal section. Fig. 3 is a vertical sectional view, on an enlarged scale, of a portion of the mechanism shown in Fig. 1. Fig. 4 is a detail plan view, partly broken away, of the combined clutch and governor. Fig. 5 is a similar view of the clutch-disk. Fig. 6 is a view similar to Fig. 1, illustrating my invention as applied to a six-wheel truck. Fig. 7 is an enlarged detail view, in vertical section, of a portion of the construction shown in Fig. 6. Fig. 8 is an enlarged detail view, in vertical section, of the upper portion of the mechanism shown in Fig. 1. Fig. 9 is a detail plan section on a still larger scale, taken on the line 9 9 of Fig. 8. Fig. 10 is a similar view in inverted plan, taken on the line 10 10 of Fig. 8; and Fig. 11 is a plan view of the interior of a passenger-coach, illustrating one mode of arranging the mechanism.

In said drawings, 15 represents a car-body, and 16 a car-truck, composing a truck-frame 17, supported by the usual springs on axles 18, having wheels 19. The truck-frame is provided with the usual center plate 20 to receive the corresponding center plate 21 of the car-body, and a king-bolt or center pin 22 passes through the two and connects the truck and body. This king-bolt is hollow or tubular, having a passage therethrough from end to end for the purpose hereinafter set forth.

Secured on one of the axles 18 and rotating therewith is a bevel-gear 23, preferably made in two separable parts bolted together, as shown in Fig. 2, for convenience in applying said gear to and removing it from the axle. In the construction shown in Figs. 1 and 2, in which I have shown my invention as applied to a four-wheel truck, this gear meshes with a similar gear 24, secured on one end of a longitudinal shaft 25, mounted in a suitable bearing 26 in a frame 27, supported from the axles 18. The frame 27 is provided for this purpose with a two-part sleeve-bearing 28, having a lining 29, of Babbitt metal or the like, in which the axle 18, on which the gear 25 is mounted, runs freely, while at its other end it is provided with a ball-and-socket or other free connection 30, by means of which it is supported from a two-part sleeve-bearing 31, similarly lined, as shown at 32, and in which the other axle 18 runs freely.

33 indicates a vertical shaft having its lower end mounted in a step-bearing 34 in the frame 27. Said shaft 33 is provided with a bevel-gear 35, which meshes with a similar gear 36 on the end of the shaft 25 opposite to that on which the gear 24 is located.

37 indicates a casing mounted on the frame 27 and inclosing the gears 23, 24, 35, and 36, the shaft 25 and its bearing 26, the lower end of the shaft 33 and its bearing 34, and the bearing 28 of the frame 27 on the axle 18. The shaft 33 has a second bearing 34ª in the casing 37 above the gear 35. This casing serves to protect the gearing and bearings from dust and dirt and may, in conjunction with the frame 27, serve as a receptacle to contain a bath of oil or other suitable lubricant, in which the parts may run.

In the construction shown in Figs. 6 and 7 of the drawings, in which my invention is shown applied to a six-wheel truck, the bevel-gear 23 is secured upon the middle axle 18 and meshes directly with the bevel-gear 35 on the shaft 33. The bearing 34 of the shaft 33 is in this case on a sleeve-bearing 38 made in two parts, bolted together, as shown in detail in Fig. 7 of the drawings, and having a lining 39, within which the hub 23$^a$ of the gear 23 may run freely. A two-part casing 40 incloses the gearing, and said casing is connected with the sleeve-bearing 38 to prevent rotation thereof and is itself prevented from rotating by means of rods 41, which extend from the truck-frame downward through suitable apertures in the flanges 42 of the casing and are provided with cushioning-springs 43 to hold the casing in proper position.

The shaft 33 extends upward through the king-bolt 22, which is made hollow for this purpose and is preferably provided with a universal joint 44 at a point adjacent to the meeting surfaces of the bearing-plates 20 and 21. In the construction shown in Fig. 1 the shaft 33 is preferably provided with a second universal joint 44$^a$ above the bearing 34$^a$. Said shaft is also preferably made in two parts, longitudinally movable relatively to each other, and for this purpose I prefer to make the lower part of said shaft squared or polygonal in section at its upper end, as indicated at 45, while the upper part is hollow and similarly squared or polygonal internally at its lower end, as indicated at 46, to fit over the lower part, as shown in detail in Fig. 3 of the drawings. The upper part of the shaft 33 has a fixed bearing 47 on the car-body 15, and owing to its mode of connection with the lower part thereof will always rotate along with the same whatever the relative positions of the car-body, truck-frame, and axles may be, while the particular construction of the shaft 33 and the mode of mounting the same will cause said shaft to accommodate itself to the shifting positions of the parts without interfering with the transmission of power. Moreover, the location of the transmitting-shaft in the axial line of the king-bolt, which is the center of motion of the truck and body, reduces the disturbing motions to a minimum. I also contemplate providing the lower portion of the shaft 33 with a bearing within the king-bolt, and in Fig. 6 of the drawings I have shown a construction for this purpose in which the shaft 33 is provided with a ball or spherical enlargement 48, which fits within a corresponding socket-bearing 49 in a sleeve 50, fitting and longitudinally movable within the hollow king-bolt 22.

It will be understood, of course, that any approved form of construction whereby the two parts of the shaft 33 may be rendered longitudinally movable relatively to each other while at the same time the rotation of the one along with the other is assured may be employed instead of the particular construction for this purpose which I have shown and described.

The power to drive the dynamo carried by the car-body may be taken from the upper part of the shaft 33 in any suitable manner, since this latter is fixed relatively to the car-body except so far as its rotary motion is concerned. I prefer, however, to employ for this purpose mechanism which I have devised and which is shown in the accompanying drawings. In this construction the shaft 33 is provided at its upper end with a friction-disk 51.

52 represents a shaft having its axis in line with the shaft 33 and supported in bearings 53, said shaft having at its lower end a disk 54, to the margin of which are pivoted at opposite points 55 friction-arms 56. These arms are provided with friction-shoes 57, adapted to bear upon the periphery of the friction-disk 51, against which they are normally held by centripetally-acting springs 58, which connects the arms 56 to the disks 54 or to each other. Normally the springs 58 overcome the centrifugal action of the arms 56 when the mechanism is in operation and cause the rotary motion of the shaft 33 to be imparted to the shaft 52. When, however, the speed of the shaft 33 becomes excessive, the centrifugal force acting on the arms 56 will overcome the centripetal action of the springs 58 and the friction-shoes will be withdrawn from contact with the friction-disk 51, thereby preventing the imparting of too high a speed to the shaft 52 and to the mechanism driven therefrom. The springs 58 may of course be rendered adjustable in any suitable manner to cause them to yield at any predetermined rate of speed.

The shaft 33 will of course in the construction shown be in motion whenever the car is in motion, and in order to provide means for starting and stopping the shaft 52 independently of the shaft 33 I provide the following mechanism: The arms 56 are provided with extensions 59, directed toward the shaft 52 above the disk 54, and the lower bearing 53 of the shaft 52 is provided with a fixed sleeve 60, on which is mounted to slide longitudinally of the shaft a tapered or conical ring 61, which may be forced downward between the inner ends of the extensions 59, and thereby disengage the arms 56 from the friction-disk 51. Withdrawal of said ring will of course cause the arms to again engage the disk. This ring is preferably operated by means of a hand-lever 62, pivoted on a projection 63 from the lower bearing 53 and having a forked or yoke-shaped end to engage the tapered ring and move the same vertically. The usual quadrant 64 and lockingpawl 65 may be provided to secure the lever 62 in any position in which it may be placed.

Obviously the shafts 33 and 52 will rotate sometimes in one direction and sometimes in the opposite direction, according to the direction in which the car is moving, and in order to obtain a continuous motion in one direction from these two opposite motions I mount loosely upon the shaft 52 two oppositely-arranged bevel-gears 66 and 67, which mesh with opposite sides of an intermediate bevel-gear 68, carried by a shaft 69. In connection with the loose gears 66 and 67 I employ oppositely-operating clutches, one of which will cause its gear to move with the shaft 52 when said shaft rotates in one direction, while the other will cause its gear to move with said shaft when rotating in the other direction. In the construction shown there is secured on the shaft 52 adjacent to the gear 66 a clutch-disk 70, having pivotally mounted thereon a dog 71, one arm of which is beveled and bears against the periphery of the hub 72 of the gear, while the other arm of the dog is acted upon by a spring 73, which tends to hold the dog against the hub. Owing to the construction and arrangement of the parts the dog will positively engage the gear and carry the same along with it and the clutch-disk and shaft when these latter rotate in one direction, while the dog will slide over the gear without imparting motion thereto when these parts rotate in the opposite direction. The gear 67 is similarly provided with a clutch-disk 74, dog 75 to bear on its hub 76, and spring 77, the arrangement and bevel of the dog 75 being the reverse of that of the dog 71. It will be seen that when the shaft 52 rotates in one direction the shaft 69 will be driven by the gear 66 and when the shaft 52 rotates in the other direction the shaft 69 will be driven by the gear 67, so that no matter in which direction the shaft 52 rotates the shaft 69 will always rotate in one and the same direction.

The shaft 69 is mounted in a suitable bearing 78 and may be connected in any suitable manner to the dynamo or other mechanism to be driven—as, for instance, by means of a pulley 79 on said shaft, over which a belt 80 passes to a pulley 81 on the armature-shaft of the dynamo 82.

I prefer to provide a fly-wheel or balance-wheel to give smoothness of motion to the mechanism, and in the present instance I have shown such a wheel 83 secured on the shaft 52. I have also shown the gears 66 and 67 as provided with ball-bearings 84 for the purpose of reducing friction and producing easy running.

The mechanism carried by the car-body is desirably mounted within a casing 85, which incloses and protects the same, said casing also serving to support the bearings 53 and 78 and being provided with a door 86, by means of which access may be had to the mechanism in the interior of said casing. When my improvements are applied to a passenger-coach, the casing and its mechanism may be arranged in the manner shown in detail in Fig. 11 of the drawings, so as to obstruct the passage-way of the car to a minimum extent.

The operation of the mechanism having been described in detail, no general description of its operation as a whole is deemed necessary. It may be observed, however, that I contemplate the employment in conjunction with the mechanism set forth of a storage battery or accumulator suitably connected therewith and adapted to be charged by the dynamo and to supply current when the car is stationary, being provided with any of the well-known automatic devices for effecting these ends.

It is obvious that various modifications of the features set forth may be made and that some of them may be omitted without departing from the principle of my invention. Moreover, in the case of a structure in which the king-bolt is omitted it is within the scope of my invention to place the vertical shaft in the vertical center of motion of the car-body and truck. I therefore do not wish to be understood as limiting myself strictly to the precise details hereinbefore set forth and shown in the accompanying drawings.

I claim—

1. In a mechanism of the character described, the combination, with a car-body and a truck connected thereto at its center, of gearing driven from one of the truck-axles, extending to the car-body, and comprising mechanism arranged substantially coincident with the vertical axis or center of relative motion of the truck and car-body, substantially as described.

2. In a mechanism of the character described, the combination, with a car-body, a truck, and a hollow or tubular king-bolt connecting the two, of gearing driven from one of the truck-axles, extending to the car-body, and comprising a shaft extending through said king-bolt, substantially as described.

3. In a mechanism of the character described, the combination, with a car-body, a truck, and a hollow or tubular king-bolt connecting the two, of a shaft extending through said king-bolt and comprising two parts longitudinally movable relatively to each other and in operative engagement, the upper part having a fixed bearing on the car-body and the lower part having a bearing on the truck and connected by suitable gearing to one of the axles thereof, substantially as described.

4. In a mechanism of the character described, the combination, with a car-body, a truck, their bearing-plates, and a hollow or tubular king-bolt connecting the two, of a shaft extending through said king-bolt, driven from one of the truck-axles and having a universal joint at a point adjacent to the bearing-plates, substantially as described.

5. In a mechanism of the character described, the combination, with a car-body, a truck, their bearing-plates, and a hollow king-bolt connecting the two, of a shaft extending through said king-bolt and comprising two parts longitudinally movable relatively to each other and in operative engagement, the upper part having a fixed bearing on the body, and the lower part having a bearing on the truck and connected by suitable gearing with one of the axles thereof, said shaft having a universal joint at a point adjacent to the bearing-plates, substantially as described.

6. In a mechanism of the character described, the combination, with a car-body, a truck, and a hollow king-bolt connecting the two, of a bevel-gear secured on a truck-axle, a non-rotating sleeve surrounding said axle, a vertical shaft having a step-bearing on said sleeve and extending upward through said king-bolt, and a bevel-gear on said shaft meshing with the bevel-gear on the axle, substantially as described.

7. In a mechanism of the character described, the combination, with a car-body, a truck, and a hollow king-bolt connecting the two, of a bevel-gear secured on a truck-axle, a sleeve surrounding said axle, a vertical shaft having a step-bearing on said sleeve and extending upward through the king-bolt, a bevel-gear on said shaft meshing with the bevel-gear on the axle, a casing connected to said sleeve and inclosing the same and the gearing, and means connected with the truck-frame for preventing rotation of said sleeve and casing, substantially as described.

8. In a mechanism of the character described, the combination, with a car-body having a swivel-truck and a shaft arranged in the axis of rotation of the truck and having a bearing on the car-body and driven from a truck-axle, of a second shaft on the car-body from which a dynamo or the like is driven, and a governor adapted to disconnect said shafts when their speed is excessive substantially as described.

9. In a mechanism of the character described, the combination, with a car-body having a swivel-truck and a shaft arranged in the axis of rotation of the truck and having a bearing on the car-body and driven from a truck-axle, of a second shaft on the car-body in alinement therewith, a friction-disk on one of said shafts, and friction-arms on the other shaft spring-actuated to grip said friction-disk and adapted to be moved outward by centrifugal force to release said disk upon an undue increase in speed, substantially as described.

10. In a mechanism of the character described, the combination, with the axle-driven shaft and a second shaft in alinement therewith, one of said shafts having a friction-disk and the other having spring-actuated pivoted friction-arms normally gripping said disk, and provided with inward extensions, of a tapered or conical sleeve movable parallel with the axis of said shafts between said extensions, and a hand-lever for operating said sleeve, substantially as described.

11. In a mechanism of the character described, the combination, with a car-body having a swivel-truck and a shaft arranged in the axis of rotation of the truck, said shaft being driven from a truck-axle and provided with two oppositely-arranged bevel-gears mounted loosely thereon, of reversely-operating clutches secured on said shaft and adapted to respectively engage said gears, a second shaft provided with a bevel-gear with which said first-mentioned bevel-gears both mesh, and a dynamo or other mechanism connected with said second shaft, substantially as described.

12. In a mechanism of the character described, the combination, with a car-body having a swivel-truck and a shaft arranged in the axis of rotation of the truck, said shaft being driven from a truck-axle and provided with two oppositely-arranged bevel-gears loosely mounted thereon, of clutch-disks, one for each gear, secured on said shaft and provided with oppositely-arranged spring-dogs to engage the respective gears when moved in opposite directions, a second shaft provided with a bevel-gear with which said first-mentioned bevel-gears both mesh, and a dynamo or other mechanism connected with said shaft, substantially as described.

13. In a mechanism of the character described, the combination, with a car-body having a swivel-truck and a shaft arranged in the axis of rotation of the truck, said shaft being driven from a truck-axle and being provided with two oppositely-arranged beveled gears loosely mounted thereon and each having a smooth cylindric hub, of clutch-disks, one for each gear, secured on said shaft and provided with oppositely-arranged spring-dogs having oppositely-beveled arms to bite upon the hubs of the respective gears when moved in opposite directions, a second shaft provided with a beveled gear with which said first-mentioned bevel-gears both mesh, and a dynamo or other mechanism connected with said shaft, substantially as described.

14. In a mechanism of the character described, the combination, with a car-body having a swivel-truck and a hollow king-bolt connecting the truck and car-body, of gearing applied to the truck-axle, a power-transmitting shaft extending through the hollow king-bolt and having an enlargement within the hollow of the bolt to provide a bearing, and a chambered bearing-block also arranged within the hollow of the king-bolt and adapted to receive the bearing enlargement of the power-shaft and to permit lateral oscillation thereof, substantially as described.

LOUIS T. MANN.

Witnesses:
FREDERICK C. GOODWIN,
L. F. MCCREA.